(12) United States Patent
Rinne

(10) Patent No.: US 7,359,403 B1
(45) Date of Patent: Apr. 15, 2008

(54) DATA SEGMENTATION METHOD IN A TELECOMMUNICATIONS SYSTEM

(75) Inventor: Mikko J. Rinne, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/806,947

(22) PCT Filed: Oct. 5, 1999

(86) PCT No.: PCT/FI99/00821

§ 371 (c)(1),
(2), (4) Date: May 25, 2001

(87) PCT Pub. No.: WO00/21253

PCT Pub. Date: Apr. 13, 2000

(30) Foreign Application Priority Data

Oct. 6, 1998 (FI) ..................... 982167

(51) Int. Cl.
*H04J 3/16* (2006.01)
(52) U.S. Cl. ............. 370/469; 370/392; 370/476
(58) Field of Classification Search ........... 370/469, 370/474, 470, 476, 465, 466, 473, 395.7, 370/395.6, 472
See application file for complete search history.

(56) References Cited

U.S. PATENT DOCUMENTS

| | | | | |
|---|---|---|---|---|
| 4,956,839 A * | 9/1990 | Torii et al. | ................... | 370/232 |
| 5,206,858 A * | 4/1993 | Nakano et al. | ............. | 370/465 |
| 5,214,639 A * | 5/1993 | Herion | ........................ | 370/412 |
| 5,280,476 A * | 1/1994 | Kojima et al. | ............... | 370/397 |
| 5,333,135 A | 7/1994 | Wendorf | | |
| 5,394,398 A * | 2/1995 | Rau | ............................ | 370/394 |
| 5,414,702 A * | 5/1995 | Kudoh | ..................... | 370/395.7 |
| 5,570,362 A * | 10/1996 | Nishimura | ................... | 370/466 |
| 5,583,859 A | 12/1996 | Feldmeier | | |
| 5,640,399 A * | 6/1997 | Rostoker et al. | ............. | 370/392 |
| 5,699,369 A * | 12/1997 | Guha | ......................... | 714/774 |
| 5,701,300 A * | 12/1997 | Jeon et al. | .................... | 370/392 |
| 5,737,332 A | 4/1998 | Corrigan et al. | | |
| 5,917,828 A * | 6/1999 | Thompson | ................... | 370/474 |
| 5,930,265 A * | 7/1999 | Duault et al. | ................ | 370/473 |
| 5,974,458 A * | 10/1999 | Abe et al. | .................... | 709/224 |
| 6,061,820 A * | 5/2000 | Nakakita et al. | ............ | 714/751 |
| 6,333,932 B1 * | 12/2001 | Kobayasi et al. | ........... | 370/389 |

FOREIGN PATENT DOCUMENTS

EP 0 786 919 7/1997
WO WO 97/38550 10/1997

OTHER PUBLICATIONS

Brill, "Die anwendernahen Schichten im ISO/OSI-Modell, Teil 1." Elektronik, Nr. 5, Mar. 4, 1988, München, West-Germany, pp. 77, 78, 80-82.
Protocols and Architecture, "The Layered Approach: The OSI Model," pp. 446-456, 12-2.

* cited by examiner

*Primary Examiner*—Chi Pham
*Assistant Examiner*—Kevin Mew
(74) *Attorney, Agent, or Firm*—Pillsbury Winthrop Shaw Pittman LLP

(57) ABSTRACT

In a telecommunications system a larger higher layer data unit (SDU) is segmented into smaller segments on the lower layer (RLC). A segmentation length information is used to indicate the lengths of the segments in a lower layer protocol data unit (PDU). Specific values of segmentation length information are employed to indicate, when necessary special information about the upper layer data unit (SDU), such as whether the upper layer data unit ends in the current data segment in the lower layer PDU or continues to the next lower layer PDU. This information is needed in the receiver to correctly assembly the segmented data.

30 Claims, 2 Drawing Sheets

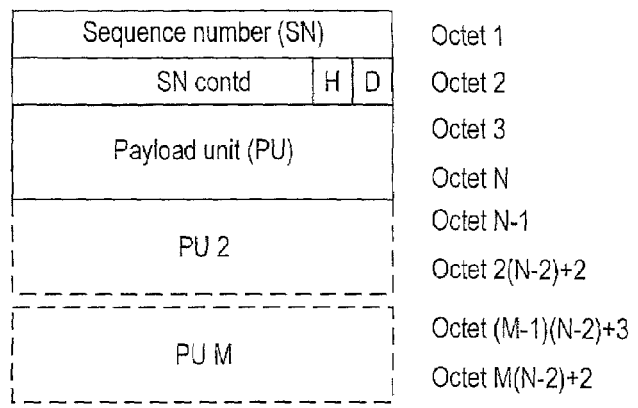
Fig. 3
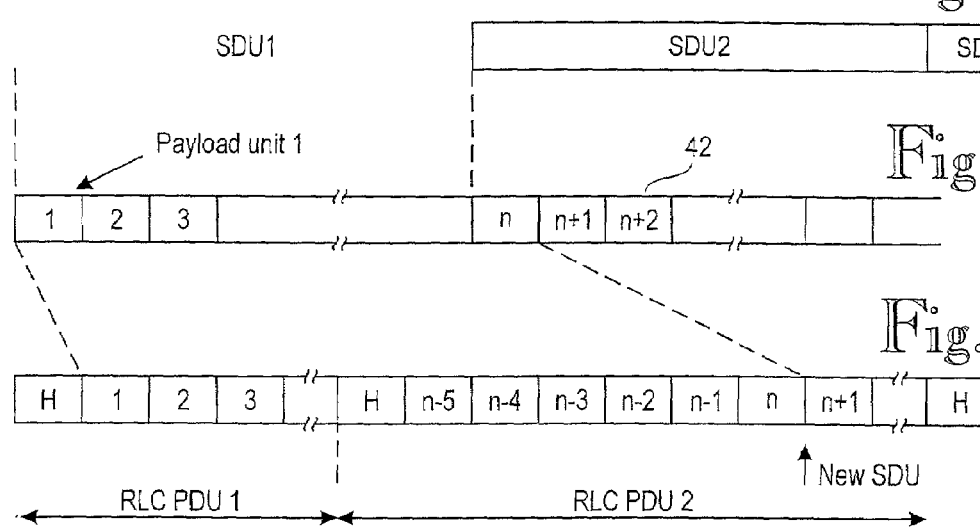
Fig. 4A
Fig. 4B
Fig. 4C
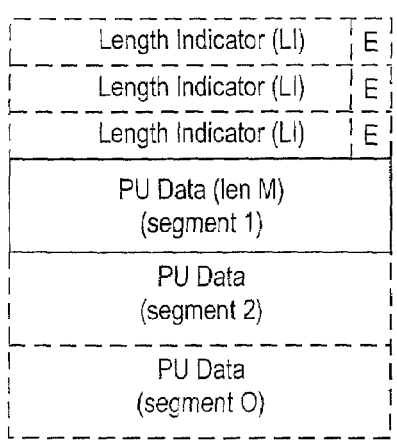
Fig. 5

DATA SEGMENTATION METHOD IN A TELECOMMUNICATIONS SYSTEM

FIELD OF THE INVENTION

The invention relates to data segmentation in a data transmission or signalling in telecommunications systems, and particularly in wireless telecommunications systems.

BACKGROUND OF THE INVENTION

Wireless communications system refers generally to any telecommunications system which enable a wireless communication between the users and the network. In mobile communications systems users are capable of moving within the service area of the system. A typical mobile communications system is a Public Land Mobile Network (PLMN).

At present third generation mobile systems, such as Universal Mobile Communication System (UMTS) and Future Public Land Mobile Telecommunication System (FPLMTS) later renamed as IMT-2000 (International Mobile Telecommunication 2000), are being developed. The UMTS is being standardized in ETSI (European Telecommunication Standards Institute) whereas ITU (International Telecommunication Union) is defining the IMT-2000 system. The radio interface is likely to be based on a wideband CDMA (code division multiple access), and therefore the third generation systems are often referred to as Wideband CDMA systems (WCDMA). These future systems are basically very much alike.

FIG. 1 shows a simplified UMTS architecture with the external reference points and interfaces to the UMTS Terrestrial Radio Access Network, UTRAN. The UTRAN consists of a set of Radio Access Networks RAN (also called Radio Network Subsystem RNS) connected to the Core Network CN through the interface Iu. These Radio Network Subsystems can be interconnected through the interconnection point (reference point) Iur. The interfaces Iu(s) and Iur are logical interfaces. Iur can be conveyed over physical direct connection between RANs or via any suitable transport network. Each RAN is responsible for the resources of its set of cells. For each connection between a mobile station MS and the UTRAN, one RAN is the Serving RAN. A RAN consists of a Radio Network Controller RNC and a multiplicity of base stations BS. The RNC is responsible for he handover decisions that require signalling to the MS. The base stations are connected to the RNC through the Iub interface. The core network CN is a conventional or future telecommunication network modified to efficiently utilize the UTRAN in a wireless communication. Telecommunication networks that are thought to be suitable core networks are second generation mobile communication systems (PSTN), such as GSM, ISDN (Integrated Services Digital Network), B-ISDN (Broadband ISDN), PDN (Packet Data Network), ATM etc.

FIG. 2 gives an overview of the assumed protocol environment in the third generation systems. Categorically, we can find three layers of the ISO/OSI layer model (International Standards Organisation/Open Systems Interconnection): physical layer (Layer 1, L1), data link layer (Layer 2, L2), and network layer (Layer 3, L3). In FIG. 2 the Layer L3 includes Radio Resources Control (RRC) protocol and upper user plane protocols. RRC takes care of all radio resources management. It negotiates quality of service QoS for a bearer service and on the basis thereof chooses needed transport format(s), (bitrates, type of coding, physical layer multiplexing), performs allocations (codes etc.), allocates identifiers for MS:s and bearer services, signals all of these parameters to MS, and supervises all handovers. User plane protocols relate to any upper layer transmission and signalling protocols. As used herein the term L3 protocols may also include the Link Access Protocol LAC set up between the MS and the core network CN although LAC may also be said to be an L2 protocol, LAN provides a peer-to-peer transportation of user data.

Layer L2 functions include the Radio Link Control (RLC) protocol and the Medium Access Control MAC. The RLC provides a radio-solution-dependent reliable link over the radio path. It takes care of segmentation and assembly of the Layer 3 data before and after transmission over the radio path, respectively, as well as retransmissions. Under the RLC the MAC function controls the mapping of the RLC protocol data units (RLC PDUs) into physical channels in the physical layer. The physical layer includes all the schemes and mechanisms used to make communications possible on the radio channel. These mechanisms include, for example, modulation, power control, coding and timing.

The RLC is capable of segmenting the higher layer PDUs. The segmenting allows a larger higher layer (e.g. L3, LAC) data unit to be split into smaller units (segments) on the lower layer (RLC). When segmenting is used, the transmitting end should indicate to the receiving end whether the same higher layer unit will continue in the next lower layer unit or a new higher level unit one will be started in the next lower layer unit. This information is needed in the receiver (either the mobile station (MS) or the network (NW)) to correctly assemble the segmented data.

In a prior art approach, a separate indicator has been used in each lower layer data segment to specify, whether the higher layer unit starts, ends or continues in the present data segment. Possible values may be the following, for example: 11 start & end; 10 start & continue; 00 continue; and 01 continue to end. The disadvantage of the prior art approach is that this extra field uses extra space in the protocol signalling and thereby causes extra overhead.

DISCLOSURE OF THE INVENTION

An object of the present invention is a segmentation method in which the overhead and other loss of performance caused by the segmentation information is minimized.

A first aspect of the invention is a data segmentation method in a telecommunications system, comprising the steps of segmenting larger data units of a higher layer into smaller protocol data units (PDU) of a lower layer so that each lower layer PDU comprises one or more data segments each containing data from a different one of the upper layer data units, providing the lower layer protocol data units containing two or more data segments, with a segmentation length information which indicates the length of the data segments, indicating with predetermined values of the segmentation length information special information about the higher level PDU, transmitting the lower level PDUs to a receiving end, assembling the segmented higher level data unit at the receiving end by means of the segmentation length information.

A second aspect of the invention is a telecommunications system, comprising
an upper protocol layer comprising data units,
a lower protocol layer comprising protocol data units having a payload size smaller than said upper layer data units,
means segmenting said upper layer data units for insertion into smaller protocol data units of a lower layer so that each lower layer PDU comprises one or more data segments each containing data from a different one of the upper layer data units,
means for inserting a segmentation length information which indicates the length of the data segments at least in the lower layer PDUs containing two or more data segments,
means for giving a predetermined value in the segmentation length information in order to provide a receiver with special information about the higher level data unit,
means for assembling the segmented higher level data unit from received lower layer PDUs at the receiver by means of the segmentation length information in said PDUs.

In the present invention specific values of segmentation length information are employed to indicate, when necessary, special information about the upper layer data unit, such as whether the upper layer data unit ends in the current data segment in the lower layer PDU or continues to the next lower layer PDU. Thus, a separate indicator field used in the prior art is avoided.

BRIEF DESCRIPTION OF THE DRAWINGS

In the following the invention will be described in greater detail by means of the preferred embodiments with reference to the accompanying drawings, in which
FIG. 3 illustrates the structure of the RLC protocol data unit (PDU),
FIGS. 4A, 4B and 4C illustrate the splitting of the upper layer service data unit (SDU) into payload units (PU) and the packing of the PUs in the RLC PDUs,
and
FIG. 5 illustrates a PU format with segmentation length indicators.

PREFERRED EMBODIMENTS OF THE INVENTION

The preferred embodiments of the invention are in the following described as implemented in the UMTS system. The invention is applicable to be used in any telecommunication system requiring segmentation of larger upper protocol layer data units into smaller units on a lower protocol layer.

As used herein the term segmentation means splitting a larger data unit of the higher layer (e.g. L3, LAC) into smaller units (segments) which can be accommodated by the lower layer (RLC) protocol data units (PDU). As a consequence, a data field of a lower layer PDU may contain one segment of an higher layer data unit, or two or more segments each containing data from a different one of the upper layer data units or padding. Segmentation information in a lower layer PDU is needed when the current upper layer data unit ends and a new upper layer data unit starts or padding is needed in the lower level PDU. The segmentation information is information included in the lower layer protocol unit in order to indicate to the receiving end how this segmentation, if any, in the PDU is done.

Figure 1:
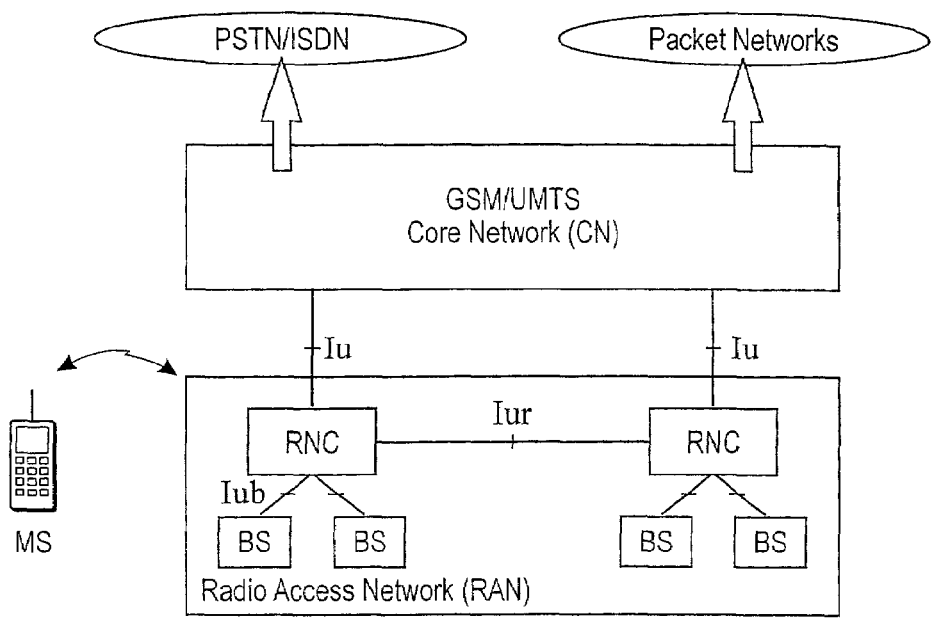
FIG. 1 shows a simplified UMTS architecture.
Figure 2:
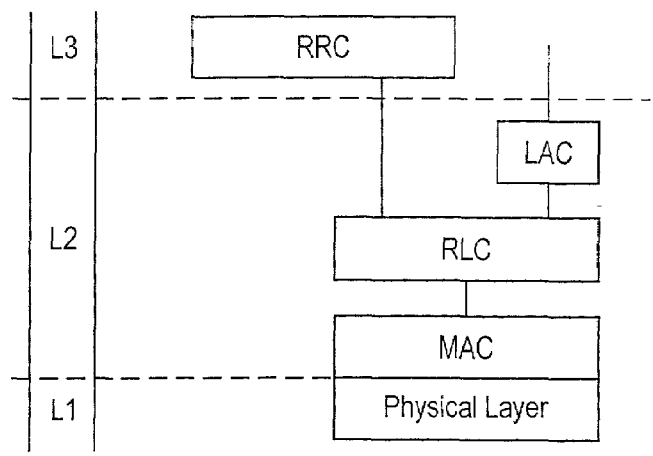
FIG. 2 illustrates an example of the protocol structure which may be used in the UMTS system.

Examples of the architecture and the simplified protocol structure of a UMTS access network were described above with reference to FIGS. 1 and 2, respectively.

The RLC can operate in assured, unassured and transparent modes. In the transparent mode no overhead is added to the data and no upper layer segmentation is maintained. In the assured and unassured modes segmentation and assembly of the upper layer PDUs is maintained. In the assured mode selective retransmission ARQ is also utilized to correct errors.

In the assured mode the RLC PDU has a control header and a data part consisting of one or more payload units (PU), as shown in FIG. 3. The PU is the smallest unit of a retransmission protocol used between the transmitting end and the receiving end for error correction. The retransmission is based on an acknowledgement of PUs and/or sending retransmission requests for missing or distorted PUs by the receiving end. The size of the PU is constant, radio bearer specific, and it is determined in the L3 bearer setup negotiation. The size of the PU can be changed only through an L3 bearer reconfiguration. Several PUs are utilized for high data rates if also low data rates need to be served or if a tight raster of bit rates is required.

The normal control header includes a 14-bit sequence number (SN) of the first payload unit in the PDU and two 1-bit extension flags, E and D. If the extension flag E is set, an extended header is used, i.e. the next two octets contain a new sequence number SN with a new extension flags E and D. The second extension flag D is used to indicate that the PU referenced by the respective sequence number start with segmentation information. The SN field indicates the sequence number of a payload unit PU in the RLC PDU. In normal assured-mode RLC PDU header it is the sequence number of the first PU in the PDU. If the PUs are not in sequences, a sequence number may be indicated separately for each PU by using the extended header. Also if some other than the first PU contains the segmentation information, the sequence number of the respective PU(s) is indicated separately by using the extended header.

If only the first PU in the RLC PDU contains the segmentation information the extension flag D in octet 2 of the PDU header is set (the first SN refers to the first PU). If several PUs contain the segmentation information in the PDU, each such PU is indicated in the PDU header by means of the respective PU sequence number with the D flag set. If no PU in the RLC PDU contains the segmentation information, no D flag is set in the PDU header.

FIGS. 4A and 4B illustrate how the upper layer (e.g. L3, LAC) data unit 41, called service data unit SDU herein, is split into smaller units 42, i.e. payload units PU. The border between two consecutive SDUs may be aligned with a border between two consecutive PUs, as shown in FIG. 4B, or it may occur in the middle of PU. The PUs 42 are then packed into RLC PDUs, as illustrated in FIG. 4C. In accordance with the terminology used herein, RLC PDU1 in FIG. 4C contains only one data segment, i.e. each of the n PUs contain data only from one upper layer data unit, namely SDU1. However, the RLC PDU2 in FIG. 4C contains two data segments, i.e. PUs n−5 . . . n contain data from the SDU1 and thereby provides the first data segment, whereas PUs from n+1 forwards contain data from the SDU2 and thereby provides the second data segment.

The segmentation information is provided by a variable number of length indicators that are included in at least one PU when needed. Length indicator is a (e.g. 7-bit) value the primary purpose of which is to indicate the length of the data segment in terms of octets (8 bits). However, all PUs in an RLC-U PDU do not need to have segmentation fields. The length indicator, for example 7-bit field, is assumed to be able to address all segments across the whole RLC PDU and therefore length indicators are normally included only in the first PU of an RLC PDU. This due to the fact that the maximum size of an RLC-U PDU data segment (approx. 40 octets) is expected to be much less than the maximum number addressable by the length indicator (128 octets). Also, it is mandatory that the length of the PDU and PU are known to both the transmitter and the receiver. The PU length is known from L3 service parameters and the RLC PDU length is recognized by receiving Layer 1 entity.

FIG. 5 illustrates a PU format with N length indicators in the first PU. The total number of segments is O, each being M octets in length. The flag E in the length indicator indicates whether there is another length indicator in the following octet (flag E=1) or not (flag E=0).

In the most simple case, where the PU contains data only from one SDU, and no segmentation information is needed in the PU. In other words, a PU without any segmentation information means that the PU is contiguous, comes from one SDU and the same SDU continues until the next PU which contains a segmentation information. No separate indicator for indicating whether the SDU continues or not is needed. If all PUs in the RLC PDU contains data from the same SDU, no segmentation information is needed in the PDU. Alternatively, the first PU in the PDU may be provided with a length indicator having a predefined value which indicates that the SDU in this PDU continues in the next RLC PDU. Such a value may be 1111110, for example. If the SDU ends at end of the current PDU, this indicated by a length indicator value which points exactly to the end of the PDU.

In the second situation the current SDU does not fill the PU completely and data from the next SDU is inserted into the remaining space in the PU. The first PU is provided with a length indicator giving the number of octets which contains data from the current SDU, i.e. the length indicator indirectly points the octet where the current segment and SDU ends. The flag E associated with the first length indicator is also set 1 to indicate that there is another length indicator. If the new SDU continues to the next PDU, a specific value, such as 11111110, is used for the second length indicator to indicate this. If the new SDU ends at end of the current PDU, this indicated by a length indicator value which points exactly to the end of the PDU.

In the third case the current SDU ends in the PDU and, since there is not more SDUs in the transmitter buffer, the rest of the PDU or part of it contains padding (fill bits). Again, the first PU is provided with a length indicator giving the number of octets which contain data from the current SDU, i.e. the length indicator indirectly points the octet where the current SDU ends. The flag E associated with the first length indicator is also set 1 to indicate that there is another length indicator. The second length indicator is provided with a specific value, such as 1111111, to indicate that there is padding until the next length indicator occurs (in the same or next PDU).

By using and interpreting some specific values of the length indicator according to the above rules, for example, no separate indicator for noting whether the SDU continues or not is needed.

An alternative way for the use of specific values of the length indicator for noting continuation or end of the SDU, might be to use one bit in the length indicator for that purpose. This approach would have a disadvantage, however. When a segmentation length indicator is used, the length of the longest possible data segment depends greatly on the number of bits that can be accommodated in one length indicator. From implementation point of view, it is desirable to maintain octet alignment, and therefore the size of the length indicator is limited by the number of extra information that needs to be accommodated in the same octet. With 7 bits, a segment of 128 octets can be addressed, as noted. If one bit is stolen to the end-indication purposes, only 64 octets can be addressed with the remaining 6 bits. By using specific values of the length indicator as described above also this disadvantage will be avoided.

The application has above been described by means of the preferred embodiments to illustrate the principles of the invention. Regarding the details the invention may vary within the scope and spirit of the accompanying claims.

The invention claimed is:

1. A data segmentation method in a telecommunications system, comprising:
   segmenting larger data units of a higher layer into smaller protocol data units of a lower layer so that at least one of the lower layer protocol data units includes two or more data segments each from two or more different higher layer data units;
   indicating with predetermined values of segmentation length information, special information about the higher layer data units, instead of the length of the segments that would be indicated by other values of the segmentation information, at least in each lower layer protocol data that contains two or more data segments from two or more different higher layer data units; and
   transmitting the lower level protocol data units to a receiving end;
   wherein the segmented higher layer data unit can be assembled at the receiving end by means of the predetermined values of segmentation length information.

2. The method of claim 1, wherein the special information includes indication whether the higher layer data unit ends in a current data segment or continues to a next lower level protocol data unit.

3. The method of claim 1, further comprising indicating with a predetermined value of the segmentation length information that the rest of the lower level protocol data unit contains padding until a next segmentation length information or a next lower level protocol data unit contains padding.

4. The method of claim 1, further comprising indicating with the segmentation length information an exact point in the end of the lower layer protocol data unit that the higher layer data unit ends.

5. The method of claim 1, further comprising indicating with a predetermined value of the segmentation length information that the higher layer data unit carried in a current data segment continues to a next lower level protocol data unit.

6. A data segmentation method in a telecommunication system, comprising:
   segmenting larger data units of a higher layer into smaller protocol data units of a lower layer so that at least one lower layer protocol data unit includes two or more data segments from two or more a different the upper layer data units;
   indicating with predetermined values of the segmentation length information special information about the higher level protocol data unit instead of the length of the segments that would be indicated in by other values of the segmentation length information, in each lower layer protocol data that contains two or more data segments from two or more different higher layer data units so that the segmented higher level data unit can be assembled at a receiving end by means of the predetermined values of the segmentation length information; and providing no segmentation information in a lower layer protocol data unit which contains data only from a single one of the higher layer data units and no padding.

7. The method of claim 1, further comprising providing segmentation information in a lower layer protocol data unit which contains data only from a single one of the higher layer data units and padding.

8. A data segmentation method in a telecommunications system, comprising:

segmenting larger data units of a higher layer into smaller protocol data units of a lower layer so that at least one lower layer protocol data unit includes two or more data segments from two or more different higher layer units;

indicating with predetermined values of the segmentation length information special information about the higher layer data unit, instead of the length of the segments that would be indicated by other values of the segmentation length information, in each lower layer protocol data that contains two or more data segments from two or more different higher layer data units so that the segmented higher level data unit can be assembled at a receiving end by means of the predetermined values of the segmentation length information;

providing each lower level protocol data unit with two or more payload units of a predetermined length, the payload units being a smallest unit in a retransmission protocol employed;

carrying the segmented higher layer data units in the payload units;

providing a segmentation indicator field in a beginning of one or more of the payload units in the lower level protocol data unit, if required; and indicating in a header of the lower layer protocol data unit which one or ones, if any, of the payload units contain the segmentation length information.

9. The method of claim 8, further comprising providing a segmentation indicator field in a beginning of a first one of the payload units for indicating segmentation information for all segments in the lower level protocol data unit, if required.

10. A telecommunications system, comprising:
an upper protocol layer including upper layer data units;
a lower protocol layer including protocol data units having a payload size smaller than the upper layer data units;
means for segmenting the upper layer data units for insertion into smaller protocol data units of a lower layer so that at least one lower layer protocol data unit includes two or more data segments, from two or more different upper layer data units;
means for providing a predetermined value in segmentation length information to a receiver, the predetermined value including special information about the upper layer data units instead of the length of the data segments that would be indicated by other values of the segmentation length information at least in each lower layer protocol data unit that contains two or more data segments from two or more different upper layer data units so as to enable assembling the segmented upper layer data units from received lower layer protocol data units at a receiver by means of the predetermined values of the segmentation length information in the lower layer protocol data units.

11. The system of claim 10, further comprising a predetermined value of the segmentation length information indicating to the receiver that a rest of the lower level protocol data unit contains no padding until a next segmentation length information or a next lower level protocol data unit contains padding.

12. The system of claim 10, further comprising a predetermined value of the segmentation length information indicating to the receiver that the higher layer data unit carried in the current data segment continues to a next lower level protocol data unit.

13. The system of claim 10, wherein the segmentation length information points exactly to an end of the lower layer protocol data unit where the higher layer data unit ends.

14. A telecommunications system, comprising:
an upper protocol layer including upper layer data units;
a lower protocol layer including protocol data units having a payload size smaller than the upper layer data units;
means for segmenting the upper layer data units for insertion into smaller protocol data units of a lower layer so that at least one lower layer protocol data unit includes two or more data segments from two or more different upper layer data units;
means for providing a predetermined value in the segmentation length information to a receiver, the predetermined value including special information about the upper layer data units, instead of the length of the data segments that would be indicated by other values of the segmentation length information, in each lower layer protocol data unit that contains two or more data segments from two or more different upper layer data units so as to enable assembling of the segmented upper layer data units from received lower layer protocol data units at a receiver by means of the special values of the segmentation length information in the lower layer protocol data units;
two or more payload units of a predetermined length in each lower level protocol data unit, with two or more payload units of a predetermined length for carrying the segmented upper layer data units, the payload unit being a smallest unit in a retransmission protocol employed;
a segmentation indicator field in a beginning of one or more of the payload units in the lower level protocol data unit, if required; and
at least one indicator in a header of the lower layer protocol data unit for indicating which one or ones, if any, of the payload units contain the segmentation length information.

15. A data segmentation method in a telecommunication system, comprising:
segmenting larger first data units of a higher protocol layer into data segments that can be accommodated by smaller second data units of a lower protocol layer, at least one second data unit comprising two or more data segments, from two or more different first data units;
indicating with predetermined values of segmentation length information special information about the first data units, instead of the length of the data segments that would be indicated by other values of said segmentation length information;

transmitting the second data units to a receiving end; and assembling the first data units from the received second data units at the receiving end by means of the special values of the segmentation length information.

16. A telecommunications system, comprising:

an upper protocol layer including first data units;

a lower protocol layer including second data unit having a payload size smaller than said first data units;

means for segmenting said first data units into data segments that can be accommodated by the second data units for insertion into the second data units, at least one second data unit comprising two or more data segments, from two or more different first data units;

means for giving a predetermined value in segmentation length information in order to provide a receiver with special information about the first data units, in place of the length of the data segments that would be indicated by other values of said segmentation length information, in each second data unit that contains data from two or more different first layer data units so as to enable assembling the segmented first data unit from received second data units at a receiver by means of the predetermined values of the segmentation length information in said second data units.

17. A mobile station, comprising:

a processor in the mobile station, said processor being configured to:

support an upper protocol layer including first data units;

support a lower protocol layer including second data unit having a payload size smaller than said first data units;

segment said first data units into data segments that can be accommodated by the second data units for insertion into the second data units, each second data unit including one or more data segments, and at least one second data unit including two or more data segments from two or more different first data units; and set a predetermined value for the segmentation length information in order to provide a receiver with special information about the first data units, instead of the length of the data segments that would be indicated by other values of said segmentation length information, in each second data unit that contains data from two or more different first layer data units so as to enable a receiver to assemble the segmented first data unit from received second data units by means of the predetermined values of the segmentation length information included in said second data units.

18. A mobile station, comprising:

a processor, said processor being configured to:

support an upper protocol layer including first data units;

support a lower protocol layer including second data unit having a payload size smaller than said first data units;

segment said first data units into data segments that can be accommodated by the second data units for insertion into the second data units, at least one second data unit including two or more data segments, from two or more different first data units;

set a predetermined value for segmentation length information in order to provide a receiver with special information about the first data units, in place of other values of said segmentation length information that would indicate the length of the data segments, in each second data unit that contains data from two or more different first layer data units so as to enable a receiver to assemble the segmented first data unit from received second data units at the receiver using the predetermined values of the segmentation length information included in said second data units;

two or more payload units of a predetermined length in each second data unit, with two or more payload units of a predetermined length for carrying the segmented first data units, the payload unit being a smallest unit in a retransmission protocol employed;

a segmentation indicator field in a beginning of one or more of the payload units in the second data unit, if required; and at least one indicator in a header of the second data unit for indicating which one or ones, if any, of the payload units contain the segmentation length information.

19. A network element, comprising:

a processor, said processor being configured to:

support an upper protocol layer including first data units;

support a lower protocol layer including second data unit having a payload size smaller than said first data units;

segment said first data units into data segments that can be accommodated by the second data units for insertion into the second data units, at least one second data unit including two or more data segments from two or more different first data units;

set a predetermined value for segmentation length information in order to provide a receiver with special information about the first data units at least in each lower layer protocol data unit containing two or more data segments carrying data from two or more different first data units, in place of the length the data segments that would be indicated by other values of said segmentation length information so as to enable a receiver to assemble the segmented first data unit from received second data units at the receiver by means of the predetermined values of the segmentation length information included in said second data units.

20. A network element, comprising:

a processor, said processor being configured to:

support an upper protocol layer including first data units;

support a lower protocol layer including second data unit having a payload size smaller than said first data units;

segment said first data units into data segments that can be accommodated by the second data units for insertion into the second data units, at least one second data unit including two or more data segments from two or more different first data units;

set a predetermined value for segmentation length information in order to provide a receiver with special information about the first data units, instead of other values of said segmentation length information that would indicate the length of the data segments in each second data unit that contains data from two or more different first layer data units so as to enable a receiver to assemble the segmented first data unit from received second data units at the receiver by means of the predetermined values of the segmentation length information included in said second data units;

two or more payload units of a predetermined length in each second data unit, with two or more payload units of a predetermined length for carrying the segmented first data units, the payload unit being a smaller unit in a retransmission protocol employed;

a segmentation indicator field in a beginning of one or more of the payload units in the second data unit, if required; and at least one indicator in a header of the second data unit for indicating which one or ones, if any, of the payload units contain the segmentation length information.

21. An apparatus, comprising:

a data segmentation unit configured to segment larger data units of a higher layer into smaller protocol data units of a lower layer, at least one lower layer protocol data unit including two or more data segments from two or more different upper layer data units;

said data segmentation unit being configured to insert in a lower layer protocol data unit containing two or more data segments from two or more different higher layer data units, segmentation length information having one of predetermined values which, instead of the length of the segments that would be indicated by other values of the segmentation length information, indicates other special information about said two or more different higher layer data units segmented into the respective lower layer data unit, so as to enable to associate each of said two or more data segments in said lower layer protocol data unit with an appropriate one of said two or more different higher layer data units when assembling the segmented higher level data unit at a receiving end.

22. An apparatus of claim 21, wherein the special information comprises an indication of whether the higher layer data unit ends in a current data segment or continues to a next lower level protocol data unit.

23. An apparatus of claim 21, wherein a predetermined value of the segmentation length information indicates that the rest of the lower level protocol data unit contains padding until a next segmentation length information or a next lower level protocol data unit contains padding.

24. An apparatus of claim 21, wherein the special information indicates an exact point in the end of the lower layer protocol data unit that the higher layer data unit ends.

25. An apparatus of claim 21, wherein a predetermined value of the segmentation length information indicates that the higher layer data unit carried in a current data segment continues to a next lower level protocol data unit.

26. An apparatus, comprising:

data desegmentation unit configured to assemble larger data units of a higher layer from data segments received in smaller protocol data units of a lower protocol layer, at least one received lower layer protocol data unit including two or more data segments from two or more different higher layer data units;

said data desegmentation unit being configured to extract, from a lower layer protocol data unit containing two or more data segments from two or more different higher layer data units, segmentation length information having one of predetermined values which, instead of the length of the segments that would be indicated by other values of the segmentation length information, indicate other special information about said two or more different higher layer data units segmented into the respective lower layer data unit, so as to associate each of said two or more data segments in said lower layer protocol data unit with an appropriate one of said two or more different higher layer data units when assembling the segmented higher level data unit.

27. An apparatus of claim 26, wherein the special information comprises an indication of whether the higher layer data unit ends in a current data segment or continues to a next lower level protocol data unit.

28. An apparatus of claim 26, wherein a predetermined value of the segmentation length information indicates that the rest of the lower level protocol data unit contains padding until a next segmentation length information or a next lower level protocol data unit contains padding.

29. An apparatus of claim 26, wherein the special information indicates an exact point in the end of the lower layer protocol data unit that the higher layer data unit ends.

30. An apparatus of claim 26, wherein a predetermined value of the segmentation length information indicates that the higher layer data unit carried in a current data segment continues to a next lower level protocol data unit.

* * * * *